Dec. 13, 1966   Q. A. HANSEN   3,291,273
HYDRAULICALLY OPERATED CLUTCH
Filed Oct. 20, 1964

INVENTOR
QUINTEN A. HANSEN
BY Wheeler, Wheeler & Wheeler
ATTORNEYS

United States Patent Office 3,291,273
Patented Dec. 13, 1966

3,291,273
HYDRAULICALLY OPERATED CLUTCH
Quinten A. Hansen, 4338 Highway 38, Franksville, Wis.
Filed Oct. 20, 1964, Ser. No. 405,141
3 Claims. (Cl. 192—85)

This invention relates to a hydraulically operated clutch.

A clutch embodying the present invention is very significantly more compact than other clutches capable of handling comparable torque. In the instant clutch, the structure which makes it compact is also advantageous in simplification of the mechanism and reduction in cost.

The clutch disks respectively keyed to the driving and driven elements of the clutch are normally forced apart by springs interposed between the disks keyed to the inner element or hub. The disks are confined on the hub between an abutment ring removably fixed on the hub and an opposed ring which serves as an annular piston and is reciprocable axially of the hub.

As an important feature of the invention, the annular cylinder in which the piston reciprocates is an integral part of the hub. Packing carried by the hub engages the inner periphery of the annular piston and is disposed in a peripheral channel which also serves to facilitate cutting the spline grooves which are provided to key alternate clutch disks to the hub. Packing axially offset from that on the hub is carried by the piston itself to engage the outer wall of the annular cylinder.

Figures 1, 2, 3:
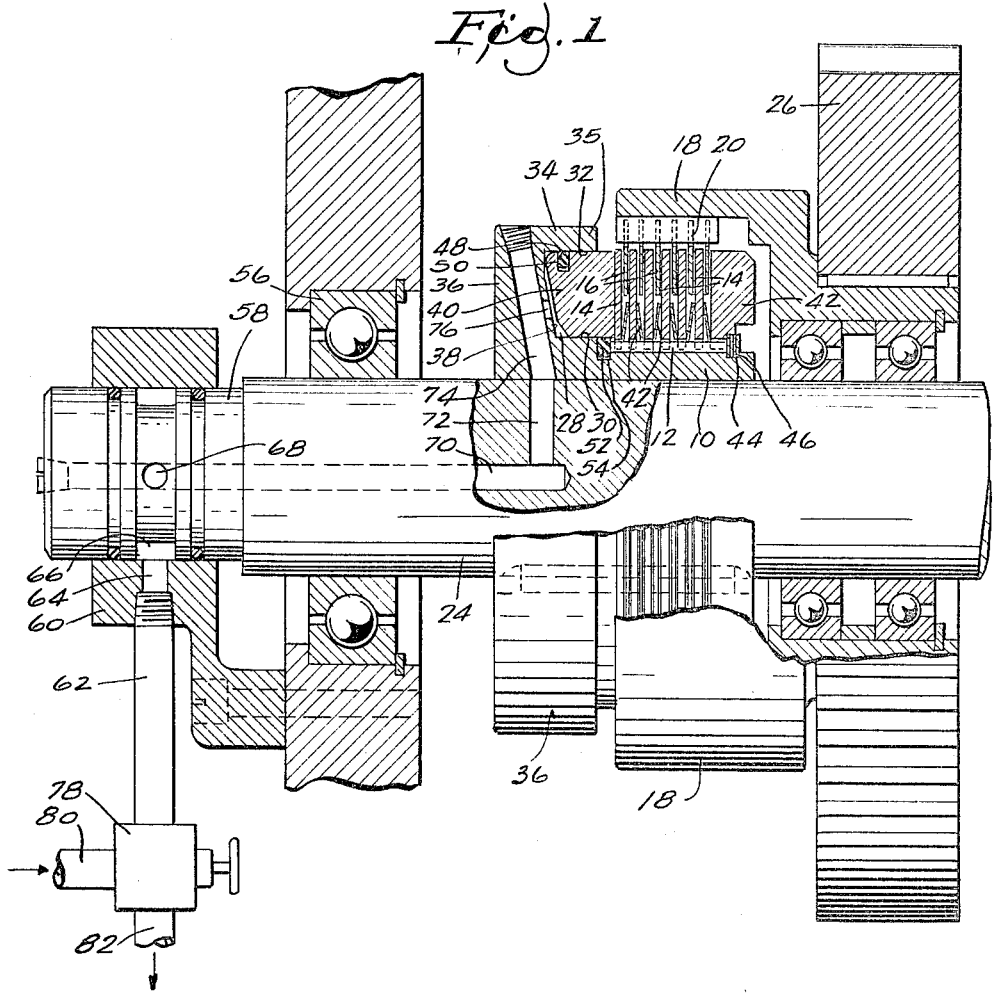
FIG. 1 is a view in axial section through a clutch embodying the invention as it appears in a typical installation.
FIG. 2 is a fragmentary detail view showing in elevation a part of a clutch disk.
FIG. 3 is a view similar to FIG. 2 showing part of a modified clutch disk.

The clutch is assembled upon a hub 10 having spline grooves 12 to which the several clutch disks 14 are keyed. Interleaved between the disks 14 are the complementary disks 16 which are keyed to the external clutch member 18 in any desired manner. In some instances, I employ teeth 20 (FIG. 2) and in other instances I employ lugs 22 (FIG. 3) to constrain the disks 16 and the outer clutch element 18 to rotate in unison while accommodating relative axial movement of the several disks.

In practice, the inner element or hub 10 is usually the driving element of the clutch and the outer element 18 is usually the driven element. However, motion can be transmitted through the clutch in either direction. The manner in which the inner and outer elements are mounted is broadly immaterial to the present invention. By way of example, I have shown the hub 10 fixed to a shaft 24 and the outer element 18 fixed to a gear 26 supported on shaft 24 and free of the shaft except as clutched thereto.

A very significant feature of the present clutch consists in the provision of an annular cylinder 28 formed between the bearing surface 30 of hub 10 and the inner peripheral bearing surface 32 of an integral annular flange 34 projecting axially from a head 36 with which one end of the hub is provided. Within the annular cylinder channel 28 is an annular piston 40 bearing on the outer and inner cylinder wall surfaces 30 and 32 and in thrust engagement with the terminal disk 14 in the series of such disks which are in splined connection with the hub. Belville springs 42 may optionally be used to maintain the disks 14 separated sufficiently to relieve the interleaved clutch disks 16 of drag friction. Thus practically no torque will be transmitted except when the entire series of disks is compressed in opposition to the bias of spring 42 by the displacement of piston 40 as a result of the admission of fluid under pressure into the cylinder channel 28 behind piston 40. The fluid is usually a liquid, although a gas may be used.

The series of disks encircling the hub is confined at one end by means of abutment ring 42 releasably fixed to the hub by the flat spring retainer 44, for which the hub has a channel at 46. The piston 40 engages the series of disks at its other end.

Since the piston 40 is annular, it is desirably provided with packing both for its inner and outer peripheries. The packing 48 is mounted in a channel 50 in the outer periphery of the piston. The packing 52 is mounted in a channel 54 cut into the bearing surface 30 of hub 10. Channel 54 has an additional function in that it provides clearance for the broaching or other cutting of the axially extending spline grooves 12 which communicate, at their near ends, with the channel 54.

It will be observed that the surface 38 of cylinder head 36 is conical and the end of piston 40 has a complementary conical form. The end 35 of the flange 34 which forms the outer side of the cylinder is preferably disposed so that it does not overhang the channel 54. This facilitates the cutting of that channel. Thus the inner packing 52 is located near the end of piston 20 which abuts the first of the clutch disks 14. Since the outer packing 48 should be remote from the cylinder end 35, the piston is made axially longer on its outer periphery than on its inner periphery, thus giving rise to the conical head form above described.

The invention is not particularly concerned with details of the manner in which the fluid pressure is supplied to the hub. In a typical installation, the shaft 24 has bearing support at 56 beyond which a reduced portion 58 of the shaft is engaged within a stationary collar 60 having a pipe 62 communicating through a radial bore 64 with an annular groove 66 in the reduced extremity 58 of the shaft. A radial duct 68 leads from groove 66 to the axial bore 70 in the shaft. In that portion of the shaft on which the hub 10 is mounted, there is a radial duct 72 leading from the bore 70 to communicate with a bore 74 in the head portion 36 of hub 10. From the bore 74, duct 76 leads into the cylinder channel 28. Consequently, when three-way valve 78 is opened to admit pressure from supply pipe 80 through the line 62 to the series of bores and ducts above described, the piston 40 is displaced toward the fixed collar 42 thereby compressing the series of driving and driven disks 14 and 16 to transmit torque through the clutch. In another position of the valve, the pressure is relieved through the discharge pipe 82 and the piston moves away from the disks and torque transmission ceases.

I claim:

1. A clutch comprising inner and outer elements, the inner element comprising a hub, a series of interleaved annular disks respectively connected with different elements, an abutment ring between said elements and detachably fixed to one of said elements at one end of said series of disks as a means of confining said disks, an annular piston opposed to said abutment ring at the other end of the series of disks, and means including a head on the hub element and an annular flange connected with the head and radially spaced from the hub element and providing a cylinder in which said piston is reciprocable, said flange and hub element having outer and inner cylinder wall bearing surfaces between which the piston is guided, inner and outer packing rings between the piston and the cylinder, one of said rings being mounted on the piston and the other being mounted on the cylinder, the piston having an external peripheral channel in which the outer packing ring is disposed, said hub having a channel in which the inner packing ring is disposed, spline grooves of said hub to which respective clutch disks are keyed being in communication with said last mentioned channel.

2. A clutch according to claim 1 in which the two packing rings are offset axially, the channel being exposed by axial offset beyond the end of the annular flange which provides the outer cylinder wall bearing surface aforesaid.

3. A clutch according to claim 2 in which the piston has a conically shaped head portion, the head on the hub element being correspondingly formed, the end of the outer periphery of the piston extending axially more remote from said series of disks than the end of the inner periphery thereof and said outer piston periphery having said peripheral channel and packing remote from the end of said annular flange.

References Cited by the Examiner

UNITED STATES PATENTS

| | | | |
|---|---|---|---|
| 2,345,860 | 4/1944 | Scott-Iversen | 192—85 |
| 2,837,192 | 6/1958 | Dunkelow | 192—85 |
| 2,876,881 | 3/1959 | Parrett | 192—85 |
| 3,142,195 | 7/1964 | Henyon | 192—85 |
| 3,213,984 | 10/1965 | Cook | 192—85 |

DAVID J. WILLIAMOWSKY, *Primary Examiner.*

BENJAMIN W. WYCHE, *Examiner.*